US009202300B2

(12) United States Patent
Saito (10) Patent No.: US 9,202,300 B2
(45) Date of Patent: Dec. 1, 2015

(54) SMOOTH FACIAL BLENDSHAPES TRANSFER (71) Applicant: Marza Animation Planet, Inc., Tokyo (JP)

(72) Inventor: Jun Saito, Burbank, CA (US)

(73) Assignee: MARZA ANIMATION PLANET, INC, Tokyo (JP)

(*) Notice: Subject to any disclaimer, the term of this patent is extended or adjusted under 35 U.S.C. 154(b) by 0 days.

(21) Appl. No.: 14/309,433

(22) Filed: Jun. 19, 2014

(65) Prior Publication Data
US 2014/0375628 A1 Dec. 25, 2014

Related U.S. Application Data (60) Provisional application No. 61/837,622, filed on Jun. 20, 2013.

(51) Int. Cl.
G06T 13/40 (2011.01)

(52) U.S. Cl.
CPC .................................. G06T 13/40 (2013.01)

(58) Field of Classification Search
None
See application file for complete search history.

(56) References Cited

U.S. PATENT DOCUMENTS 7,292,250 B2 * 11/2007 Sepulveda .................... 345/473
8,044,962 B1 * 10/2011 Pighin et al. ................. 345/473
8,207,971 B1 * 6/2012 Koperwas et al. ............ 345/473
8,922,553 B1 * 12/2014 Tena et al. .................... 345/423
2005/0168463 A1 * 8/2005 Sepulveda .................... 345/423

OTHER PUBLICATIONS

Ho et al., "Spatial Relationship Preserving Character Motion Adaptation", ACM Trans. Graph., Jul. 2010, vol. 29, Issue 4, No. 33:1-33:8.
Lee et al., "Realistic Modeling for Facial Animation", In Proceedings of the 22nd annual conference on Computer graphics and interactive techniques, ACM, 1995, pp. 55-62.
Li et al., "Example-Based Facial Rigging", ACM Transactions on Graphics (Proceedings SIGGRAPH 2010), Jul. 2010, vol. 29, Issue 4, Article No. 32.
Nealen et al., "Laplacian Mesh Optimization", In Proceedings of the 4th international conference on Computer graphics and interactive techniques in Australasia and Southeast Asia, 2006, pp. 381-389.
Noh et al., "Expression Cloning", SIGGRAPH '01 Proceedings on the 28th annual conference on Computer graphics and interactive techniques, 2001, pp. 277-288.
Sifakis et al., "Simulating Speech with a Physics-Based Facial Muscle Model", Proceedings ACM SIGGRAPH Symposium on Computer Animation (SCA), 2006, pp. 261-270.
Sumner et al., "Deformation Transfer for Triangle Meshes", ACM Transactions on Graphics, Aug. 2004, vol. 23, Issue 3, pp. 399-405.

(Continued)

Primary Examiner — Said Broome
(74) Attorney, Agent, or Firm — Chen Yoshimura LLP (57) ABSTRACT A method for deformation transfer of a source three-dimensional (3D) geometry to a target 3D geometry for computer-implemented blendshapes animation includes solving a linear system equation in which blendshapes deformation transfer with a virtual triangular mesh is performed, where the virtual triangular mesh having a plurality of virtual triangles is assigned to a prescribed region of an animated figure that are presented by a computer-generated mesh, and/or in which blendshapes deformation transfer is performed with Laplacian smoothing.

10 Claims, 7 Drawing Sheets (56) References Cited

OTHER PUBLICATIONS

Sumner, "Mesh Modification Using Deformation Gradients", PhD thesis, Massachusetts Institute of Technology, 2005.
Vlasic et al., "Face Transfer with Multilinear Models", In ACM Transactions on Graphics (TOG), 2006, Article No. 24, pp. 426-433.
Waters, "A Muscle Model for Animating Three-Dimensional Facial Expression", Proceedings of the 14th annual conference on Computer graphics and interactive techniques, Jul. 1987, vol. 21, No. 4, pp. 17-24.
Zhou et al., "Deformation Transfer to Multi-Component Objects", Computer Graphics Forum (Proceedings of EUROGRAPHICS), vol. 29 (2010), No. 2, pp. 319-325.

* cited by examiner

SMOOTH FACIAL BLENDSHAPES TRANSFER

This application claims the benefit of Provisional Application No. 61/837,622, filed on Jun. 20, 2013, which is hereby incorporated by reference in its entirety.

BACKGROUND OF THE INVENTION

1. Field of the Invention

This invention relates to a method for generating three-dimensional (3D) geometry for computer-animated figures or the like and a system therefor.

2. Description of Related Art

Blendshape is a classic yet effective method in defining high-quality facial deformation with intuitive artistic control for applications such as films and games. One of its drawbacks is the difficulty of mass production. Blendshapes animate characters by interpolating target facial shapes. In practice, around 100 or more target shapes are needed for each character, which can result in enormous labor of meticulous facial modeling when there are many characters appearing in films or games.

Deformation transfer is a viable technique for creating large numbers of facial blendshapes efficiently. Artists can concentrate on modeling the blendshape targets of a single base character and then transfer them automatically to multiple characters. The transferred geometries are usually good enough to immediately start final cleanup and fine-tuning. This drastically speeds up the facial rigging workflow.

While this transfer pipeline proves to be effective, it also exposes the limitations of the original deformation transfer technique. First, it is not contact-aware, which for facial blendshapes causes eyelids to penetrate, or not shut completely. Secondly, it is not smoothness-aware, often yielding crumpling artifact where the mesh is extremely concentrated, e.g., eye lids and mouth corners.

SUMMARY OF THE INVENTION

Accordingly, the present invention is directed to a method for improved facial blendshapes and a system therefor that substantially obviate one or more of the problems due to limitations and disadvantages of the related art.

An object of the present invention is to provide an improved method for producing deformed 3D geometry representing a 3D object for computer-implemented blendshapes animation and a system therefor.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a method for deformation transfer of a source three-dimensional (3D) geometry to a target 3D geometry for computer-implemented blendshapes animation, the method including: assigning a virtual triangular mesh having a plurality of virtual triangles to a prescribed region of an animated figure that are presented by a computer-generated mesh; and solving a linear system equation by a computer to generate a mesh that represents a deformed state of the animated figure, said linear system equation being expressed by:

$$\begin{bmatrix} A \\ \alpha A_v \end{bmatrix} X' = \begin{bmatrix} F \\ \alpha F_v \end{bmatrix},$$

where X' is unknown vertex positions of a deformed mesh, F is deformation gradient of a nondeformed state, and A is a matrix that represents deformation gradient when multiplied by the vertex positions of the deformed mesh, and where $A_v$ is a deformation gradient matrix of the virtual triangles of the deformed state, $F_v$ is a deformation gradient of the virtual triangles of the nondeformed state, and $\alpha$ is a prescribed weight.

In another aspect, the present invention provides a method for deformation transfer of a source three-dimensional (3D) geometry to a target 3D geometry for computer-implemented blendshapes animation, the method including: solving a linear system equation by a computer to generate a mesh that represents the deformed state of an animated figure, said linear system equation being expressed by:

$$\begin{bmatrix} A \\ DL \end{bmatrix} X' = \begin{bmatrix} F \\ DLX \end{bmatrix},$$

where X' is unknown vertex positions of a deformed mesh, F is deformation gradient of a nondeformed state, and A is a matrix that represents deformation gradient when multiplied by the vertex positions of the deformed mesh, and where X represents vertex positions of the deformed mesh, L is a mesh Laplacian and D is a diagonal matrix storing regularization weight per vertex.

In another aspect, the present invention provides the above-described method, wherein said linear system equation is expressed by:

$$\begin{bmatrix} A \\ \alpha A_v \\ DL \end{bmatrix} X' = \begin{bmatrix} F \\ \alpha F_v \\ DLX \end{bmatrix},$$

where X represents vertex positions of the deformed mesh, L is a mesh Laplacian and D is a diagonal matrix storing regularization weight per vertex.

In another aspect, the present invention provides a system for deformation transfer of a source three-dimensional (3D) geometry to a target 3D geometry for computer-implemented blendshapes animation, the system including a processor; and a memory connected to the processor, storing instructions and data for causing the processor to execute the following steps: assigning a virtual triangular mesh having a plurality of virtual triangles to a prescribed region of an animated figure that are presented by a computer-generated mesh; and solving a linear system equation by a computer to generate a mesh that represents a deformed state of the animated figure, said linear system equation being expressed by:

$$\begin{bmatrix} A \\ \alpha A_v \end{bmatrix} X' = \begin{bmatrix} F \\ \alpha F_v \end{bmatrix},$$

where X' is unknown vertex positions of a deformed mesh, F is deformation gradient of a nondeformed state, and A is a matrix that represents deformation gradient when multiplied by the vertex positions of the deformed mesh, and where $A_v$ is a deformation gradient matrix of the virtual triangles of the deformed state, $F_v$ is a deformation gradient of the virtual triangles of the nondeformed state, and $\alpha$ is a prescribed weight.

In another aspect, the present invention provides a system for deformation transfer of a source three-dimensional (3D) geometry to a target 3D geometry for computer-implemented blendshapes animation, the system including a processor; and a memory connected to the processor, storing instructions and data for causing the processor to execute the following step: solving a linear system equation by a computer to generate a mesh that represents the deformed state of an animated figure, said linear system equation being expressed by:

$$\begin{bmatrix} A \\ DL \end{bmatrix} X' = \begin{bmatrix} F \\ DLX \end{bmatrix},$$

where X' is unknown vertex positions of a deformed mesh, F is deformation gradient of a nondeformed state, and A is a matrix that represents deformation gradient when multiplied by the vertex positions of the deformed mesh, and where X represents vertex positions of the deformed mesh, L is a mesh Laplacian and D is a diagonal matrix storing regularization weight per vertex.

In another aspect, the present invention provides the above-described system where wherein said linear system equation is expressed by:

$$\begin{bmatrix} A \\ \alpha A_v \\ DL \end{bmatrix} X' = \begin{bmatrix} F \\ \alpha F_v \\ DLX \end{bmatrix},$$

where X represents vertex positions of the deformed mesh, L is a mesh Laplacian and D is a diagonal matrix storing regularization weight per vertex.

It is to be understood that both the foregoing general description and the following detailed description are exemplary and explanatory, and are intended to provide further explanation of the invention as claimed.

DETAILED DESCRIPTION OF THE PREFERRED EMBODIMENTS

This disclosure describes, in one aspect, a method to improve the quality of the facial blendshapes synthesized using deformation transfer by introducing the idea of contact and smoothness awareness. Simply applying deformation transfer for face models easily results in penetrations and separations, which do not exist in the original data. As there is no concept of smoothness, crumpling artifacts appear where the mesh is extremely concentrated, e.g., eyelids and mouth corners. These issues are resolved by first introducing the concept of virtual triangles and then adding a Laplacian energy term into the linear problem to be solved for the deformation transfer. Experimental results show that this system reduces the amount of artifacts caused by the original deformation transfer, improving the efficiency of the animation pipeline.

In this disclosure, in one aspect of the present invention, a method to cope with these problems is proposed. In order to cope with the problem of contact-awareness, in one aspect of the present invention, virtual triangles are inserted to open areas of the face where there are large deformations during the animation. The virtual triangles help preserve the spatial relationships between separate parts of the face. Thus, the contacts and separations dynamically happening with the original shape will be correctly transferred to the target shape. In addition to that, Laplacian constraints are added, which preserve the smoothness of the target model even when the transfer produces crumpling effects.

Experimental results show that this method can reduce the artifacts caused by the deformation transfer of the blendshapes, which can significantly reduce manual cost of removing them by editing the target faces. The method greatly helps transfer faces that have different geometry from that of the original face. This method naturally extends the original deformation transfer framework when it is applied for face blendshapes, as only minor preprocessing and additional constraints are needed to greatly improve the pipeline of the facial rigging process.

<Facial Animation and Blendshapes>

An article by Waters, WATERS, K. 1987, "A muscle model for animating three dimensional facial expression," Computer Graphics 22, 4, 17-24, originates the stream of anatomical modeling for facial animation by controlling the facial skins using the underlying linear and elliptical muscle models. To determine which muscles to contract, the FACS system (described in EKMAN, P., AND FRIESEN, W. 1978, "Facial action coding system: A technique for the measurement of facial movement," Consulting Psychologists Press) that describes which muscle groups are used for different expressions is used. Such an approach is effective for decreasing the DOF of the face models as the skin can be composed of thousands and millions of faces and vertices. The musculoskeletal model has evolved over time to synthesize more realistic facial animation. For example, an article by Lee et al. (LEE, Y., TERZOPOULOS, D., AND WATERS, K. 1995, "Realistic modeling for facial animation," In Proceedings of the $22^{nd}$ annual conference on Computer graphics and interactive techniques, ACM, 55-62) discloses a physiological model with three layers (skin, fat and muscle) to synthesize an animation of arbitrary humans. An article by Sifakis et al. (SIFAKIS, E., SELLE, A., ROBINSON-MOSHER, A., AND FEDKIW, R. 2006, "Simulating speech with a physics-based facial muscle model," Proceedings ACM SIGGRAPH Symposium on Computer Animation (SCA) 2006, 260-270) discloses a high-detail musculoskeletal model and estimate the muscle activities from the geometry data and reproduce an equivalent motion data by physical simulation.

Despite the realistic animations that can be produced by the biomechanical models, there are several issues with using them as rigs for animators. First, they are much more computationally intensive than other geometry-based methods. Second, the development of such models requires too much overhead. Third, there is not enough artistic control as the facial expressions can only be produced by muscle contraction.

Blendshapes remains as classic yet competitive technique to define the rich expression space of facial deformation with maximum artistic control. The advantages in the use of blendshapes are:

1. Availability—virtually all professional computer animation packages implement blendshape-based deformation.

2. Intuitiveness—deformation is defined as weighted sum of some example shapes and is easy to interpret to anyone.

3. Artistic control—if modeler crafts an example shape, you are guaranteed to get that shape in deformation (unless multiple examples influence the same region).

The last property is especially important in the quality control of productions involving many animators, so they will be consistent with the style of "smile" of a certain character from the given facial rig, instead of each animator figuring out his own interpretation of how the character's "smile" should look. Although blendshapes is just simple linear blending, it is surprisingly expressive—with the proper set-up and careful modeling of FACS-based target expression shapes, it can even fake complex deformations with the look of internal skeletons pushing layers of muscles and skin on top of them.

Despite these advantages, one remaining problem is mass production. The target faces need to be manually crafted by artists in order to be applied for novel faces. For example, a film Space Pirate Captain Harlock (2013) featured 8 main characters with extensive lip syncing and facial acting, 39 secondary characters requiring good amount of facial performance, and 45 tertiary characters requiring some degree of facial expressions. It was realized from the very early stage of the technical preproduction that blendshapes was the way to go for film-quality facial animation, but at the same time, so many high-quality blendshapes cannot be produced with our limited resources. Developing an efficient facial transfer system is important for the success of film productions.

<Facial Blendshapes Transfer>

To solve the problem of mass production, the idea of expression cloning is proposed in NOH, J.-Y., AND NEUMANN, U. 2001, Expression cloning. SIGGRAPH 2001, Computer Graphics Proceedings. Expression cloning sets some landmarks on the face and spatially warps its geometry using RBF to transfer expressions. It was realized that this method introduces too much interpolation artifacts and the choice of optimal landmarks is ad-hoc.

Deformation transfer (described in SUMNER, R. W., AND POPOVI'C, J. 2004, Deformation transfer for triangle meshes, ACM Trans. Graph. 23, 3 (Aug.), 399-405) is a technique that applies deformation of an example animation to other target objects in the gradient space. It is widely applied for retargeting movements for deformable characters and facial models. The original deformation transfer technique has proven to be effective for the blendshapes transfer in the production of Captain Harlock. However, the present inventor also noticed room for further improvement where the penetrations and separations of adjacent parts start to appear.

In order to cope with problems of penetration and separations, spatial relationship-based approaches are proposed so that the location of each body part with respect to the others are preserved after the transfer or motion retargeting. Examples of such techniques are described in ZHOU, K., XU, W., TONG, Y., AND DESBRUN, M. 2010. Deformation transfer to multi-component objects, Computer Graphics Forum (Proceedings of EUROGRAPHICS 2010) 29, 2; and HO, E. S. L., KOMURA, T., AND TAI, C.-L. 2010, Spatial relationship preserving character motion adaptation, ACM Trans. Graph. 29, 4 (July), 33:1-33:8. The key idea of these approaches is to encode the spatial relations using minimal spanning trees or Delaunay tetrahedralization and transfer those data instead of only the original gradient data. Zhou et al. show examples of transferring the motion of a horse model to a horse model composed of multiple independent rocks. Ho et al. show examples of retargeting close interactions of multiple characters while preserving the context. The advantage of these techniques is that they can preserve the contextual information such as contacts without explicitly specifying them. The present disclosure encodes the spatial relation information in the deformation transfer framework.

An article by Li et al. (LI, H., WEISE, T., AND PAULY, M. 2010. Example-based facial rigging. ACM Transactions on Graphics (Proceedings SIGGRAPH 2010) 29, 3 (July)) proposes a facial blendshapes transfer technique extending deformation transfer framework. It computes transfers respecting artist-given character-specific features (e.g., wrinkles). Because it uses the same deformation transfer framework, the method for contact-awareness and smoothness described in this disclosure can naturally co-exist, complementing each other.

<Deformation Transfer>

Deformation transfer is formulated as a minimization problem in the gradient space of the source deformation (i.e., deformation from base character's neutral face to some expression) and the target deformation (i.e., deformation from some specific character's neutral face to some expression). This minimization is expressed as $$\min \|F - AX'\| \quad (1)$$

where F is the source (base character's) deformation gradient, A is the matrix which computes deformation gradient when multiplied by the vertex positions of the target character's deformed mesh, and X' is the unknown vertex positions of the target character's deformed mesh.

This yields the over-constrained linear system $$AX' = F \quad (2)$$

which can be solved in a least squares sense as $A^T A X' = A^T F$. Matrices F and A are constructed, as follows.

The deformation gradient for a single triangle is defined as rotation and scaling from the nondeformed state to the deformed state, which can be expressed as a 3×3 matrix. To compute this, the fourth auxiliary vertex $v_{i4}$ $$V_{i4} = V_{i1} + \frac{(V_{i2} - V_{i1}) \times (V_{i3} - V_{i1})}{\sqrt{\|(V_{i2} - V_{i1}) \times (V_{i3} - V_{i1})\|}}$$

is added to the triangle to form a tetrahedron. Then $J_j$, a 3×3 matrix encoding deformation gradient for triangle j, is computed by solving the linear system $$J_j V_j = V'_j \quad (3)$$

where $V_j$ and $V'_j$ are 3×3 matrices containing nondeformed and deformed edge vectors of the tetrahedron corresponding to triangle j:

$$V_j = [v_{j2} - v_{j1} \, v_{j3} - v_{j1} \, v_{j4} - v_{j1}]$$

$$V'_j = [v'_{j2} - v'_{j1} \, v'_{j3} - v'_{j1} \, v'_{j4} - v'_{j1}]$$

The deformation gradient for the entire triangular mesh F is simply a concatenation of $J_j$ for all triangles as:

$$F = [J_1 J_2 \ldots J_M]^T$$

where M is the number of triangles. Section 5 describes efficient computation of F.

The matrix A on the left side of Eq. (2) is constructed in a similar fashion but without forming tetrahedra with auxiliary vertices. For a single nondeformed triangle j of the target character, edge vectors are placed in the 3×2 matrix as $$W_j = [v_{j2} - v_{j1} \, v_{j3} - v_{j1}],$$

and its pseudo-inverse is computed as $$W_j^+ = (W_j^T W_j)^{-1} W_T.$$

SUMNER, R. W. 2005 Mesh Modification Using Deformation Gradients. PhD thesis, Massachusetts Institute of Technology ("Sumner Theses") does this by QR decomposition. Denoting elements of $W_j^+$ as $$W_j^+ = \begin{bmatrix} a & b & c \\ d & e & f \end{bmatrix}$$

then $T_j$ is prepared as $$T_j = \begin{bmatrix} (-a-d) & a & d \\ (-b-e) & b & e \\ (-c-f) & c & f \end{bmatrix}$$

and its elements are placed in rows 3j, 3j+1, and 3j+2 (corresponds to triangle id j) and columns $i_1$, $i_2$, and $i_3$ (corresponds to vertex ids in triangle j) in the matrix A. Page 65 of Sumner Theses describes this matrix construction in details.

It is important to note that in this formulation, while nondeformed and deformed meshes must have the same connectivity, they do not need to be manifold, watertight, or of a particular genus (see Sumner Theses). In other words, it does not matter how triangles in each mesh are connected, as long as there is one-to-one correspondence between nondeformed and deformed meshes. This insight leads to an extension of the framework for contact-awareness.

<Extended Deformation Transfer>

This section of the present disclosure describes three additional constraints to the original deformation transfer: contact, smoothness, and anchoring. The last subsection explains how to integrate these three constraints together.

"Contact Awareness"

Contact awareness can be naturally incorporated into deformation transfer by simply adding virtual triangles where the interactions occur. A list of virtual triangles is appended to the list of actual mesh triangles, and then the deformation gradient matrices are constructed as in the original method. This yields a linear system with the contact awareness defined in the gradient space as:

$$\begin{bmatrix} A \\ \alpha A_v \end{bmatrix} X' = \begin{bmatrix} F \\ \alpha F_v \end{bmatrix} \quad (4)$$

where $A_v$ is the deformation gradient matrix of the destination virtual triangles, $F_v$ is the deformation gradient of the source virtual triangles, and a is the user given weight to control how strong the virtual triangles act.

In some of embodiments, the vertices in contact are manually specified by users. Manual labor here is trivial because this is only done once for the base character. Virtual triangles are then formed by filling in the hole defined by specified vertices and triangulating that region. This could be done by projecting specified vertices onto 2D subspace (using PCA or parameterization like least squares conformal maps or user-given texture coordinates) and then performing Delaunay triangulation on them.

"Mesh Smoothness"

As mentioned in the previous section, because deformation transfer treats triangles independently, there is no guarantee that the resulting mesh will be as smooth as the source mesh. This can cause crumpling artifacts where the mesh is highly concentrated because it is difficult to precisely model extremely small and elongated polygons in those regions. This issue is resolved by smoothing the mesh with the formulation resembling Laplacian mesh optimization Described in NEALEN, A., IGARASHI, T., SORKINE, O., AND ALEXA, M. 2006, Laplacian mesh optimization. 381-389. The linear system respecting the curvature of the source deformed mesh is:

$$\begin{bmatrix} A \\ DL \end{bmatrix} X' = \begin{bmatrix} F \\ DLX \end{bmatrix} \quad (5)$$

where X is the vertex positions of the source deformed mesh, L is the mesh Laplacian and D is the diagonal matrix storing regularization weight per vertex, to make it affect regions in need of smoothing. These per-vertex weights are first computed as d=max(a, a')/min(a, a'), where a and a' are per-vertex areas in the nondeformed and deformed mesh, respectively, to assign high smoothing weights to regions where most stretching and shrinking occurs. The small weights are then clamped to 0 (to select regions with high area change ratio), and Laplacian smoothing is applied to the weights themselves for better continuity.

Virtual triangles from the previous section should be excluded from the computation of mesh Laplacian because they are not a part of the smooth surface.

"Anchoring"

Because the minimization in Eq. (1) is defined in the gradient space and is translation-independent, at least one of the vertices needs to be anchored. In practice, most vertices in facial blendshape targets do not move from their nondeformed state and can be aggressively used in anchoring. This also avoids undesirable small deformation propagating to regions which should not move at all, e.g., back of the head, because Eq. (1) is a global optimization and any small deformation can affect all vertices.

A system can be configured such that it can automatically find anchor vertices, which move less than a certain threshold ∈ from the nondeformed to the deformed state. Users can also manually specify vertices to anchor.

The deformation gradient of non-anchored vertices $\hat{F}$ is computed as $\hat{F} = F - \overline{AX}$ where $\hat{A}$ is made of columns of corresponding anchored vertices from A and $\hat{X}$ of rows of corresponding anchored vertices from X. Final linear system respecting anchoring is $\hat{A}\hat{x} = \hat{F}$ where $\hat{A}$ is made of columns of corresponding non-anchored vertices from A and $\hat{x}$ is the unknown, deformed vertex positions of non-anchored vertices.

The Laplacian matrix in the previous section needs to be constructed with non-anchored vertices. This in turn means that Laplacian matrices are built for all deformed states, though the mesh connectivity of those states are the same.

"Solving Integrated Problem"

All of these three constraints are solved together in the following way. First, A and F are constructed with the virtual triangles appended. Columns corresponding to anchored vertices are removed from A, and then F is updated accordingly. At last, Laplacian smoothness term is appended to the system. Put together, the linear system is formulated as $$\begin{bmatrix} \hat{A} \\ \alpha \hat{A}_v \\ \hat{D}\hat{L} \end{bmatrix} \hat{x} = \begin{bmatrix} \hat{F} \\ \alpha \hat{F}_v \\ \hat{D}\hat{L}\hat{x} \end{bmatrix}$$

with hat denoting matrices respecting anchored vertices.

<Tool Design and Implementation>

In one embodiment, a blendshapes transfer tool is constructed to run on Autodesk Maya and is fully implemented in Python using NumPy/SciPy. Sparse linear system in Eq. (2) is constructed using SciPy sparse module. Umfpack direct solver is used to solve the system.

The choice of the use of embedded Python in Maya and NumPy/SciPy allowed us to quickly prototype and test various academic papers using actual production data. This choice also helped us in smooth transition from research prototype to production tools.

Well-designed Python implementation was practically fast enough even for extensive production use (see Section 6 for a benchmark). Because mesh processing in general involves working with thousands of faces and vertices, it is wise to design the tool to work in blocks of data rather than looping over every single element, especially when using interpreted languages like Python.

A preferable way of designing an efficient tool using Maya and NumPy/SciPy is to obtain an array of data from Maya in a single batch, do mathematical operations in a block manner on that data array using NumPy/SciPy, and put the resulting array back into Maya in a single batch. Loops of any kind, whether it is for loops or list comprehensions in Python, should be avoided as much as possible. For example, in Maya all vertex coordinates of a mesh can be read in and written out with one call to MFnMesh::getPoints( ) and MFnMesh::setPoints( ), respectively.

Assembly of the source character's deformation gradient F in Eq. (2) should be done in a block fashion, instead of solving 3×3 linear system in Eq. (3) for each triangle. This can be easily accomplished by assembling a sparse block matrix as $$\begin{bmatrix} V_1^T & \cdots & 0 \\ \vdots & \ddots & \\ 0 & & V_M^T \end{bmatrix} F = \begin{bmatrix} V_1'^T \\ \vdots \\ V_M'^T \end{bmatrix}$$

and solving for F. The sparse block matrix on the left side of the equation is efficiently built using bsr_matrix of SciPy sparse module. Since this sparse block matrix only depends on the base character's nondeformed state, it can be prefactored and reused for computing deformation gradient of each blendshape target.

Matrix A on the left side of Eq. (2) is also constructed in a block manner. Computing pseudo-inverse $W_j^+$ for all triangles can be done by solving one linear system $$\begin{bmatrix} W_1 & \cdots & 0 \\ \vdots & \ddots & \\ 0 & & W_M \end{bmatrix} \begin{bmatrix} W_1^+ \\ \vdots \\ W_M^+ \end{bmatrix} = \begin{bmatrix} I \\ \vdots \\ I \end{bmatrix}$$

in a least squares sense. The sparse block matrix on the left side is again built using bsr_matrix of SciPy sparse module. The right hand side of this equation is a stack of 3×3 identity matrices. Elements of $W^+$ can then be placed into matrix A with just one call to coo_matrix of SciPy sparse module, without looping over elements.

<Experimental Results>

A computer-implemented system incorporating the above-described method was constructed in a manner described, and geometries for animated faces were generated. As described above, any computers or like systems that have a processor with sufficient computation power and one or more appropriate memories can implement the above-described method.

Figure 1:
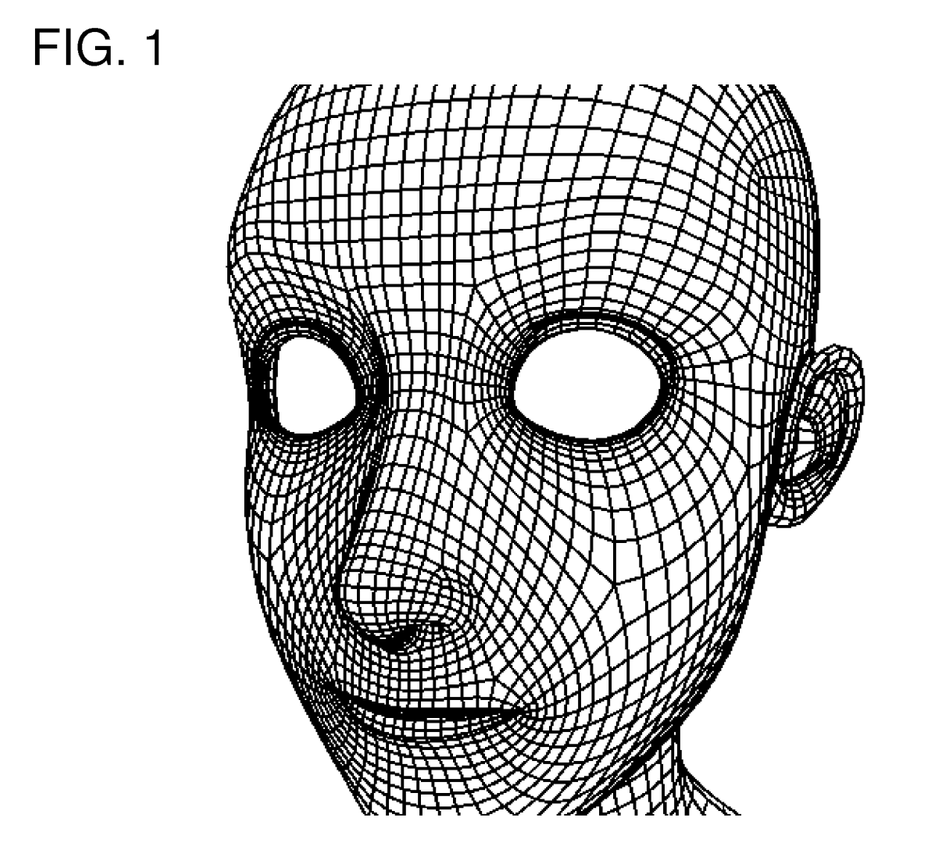
FIG. 1 shows a 3D geometry of a face of a man base character before deformation; it shows his neutral face 3D geometry constructed by a mesh.
Figure 2:
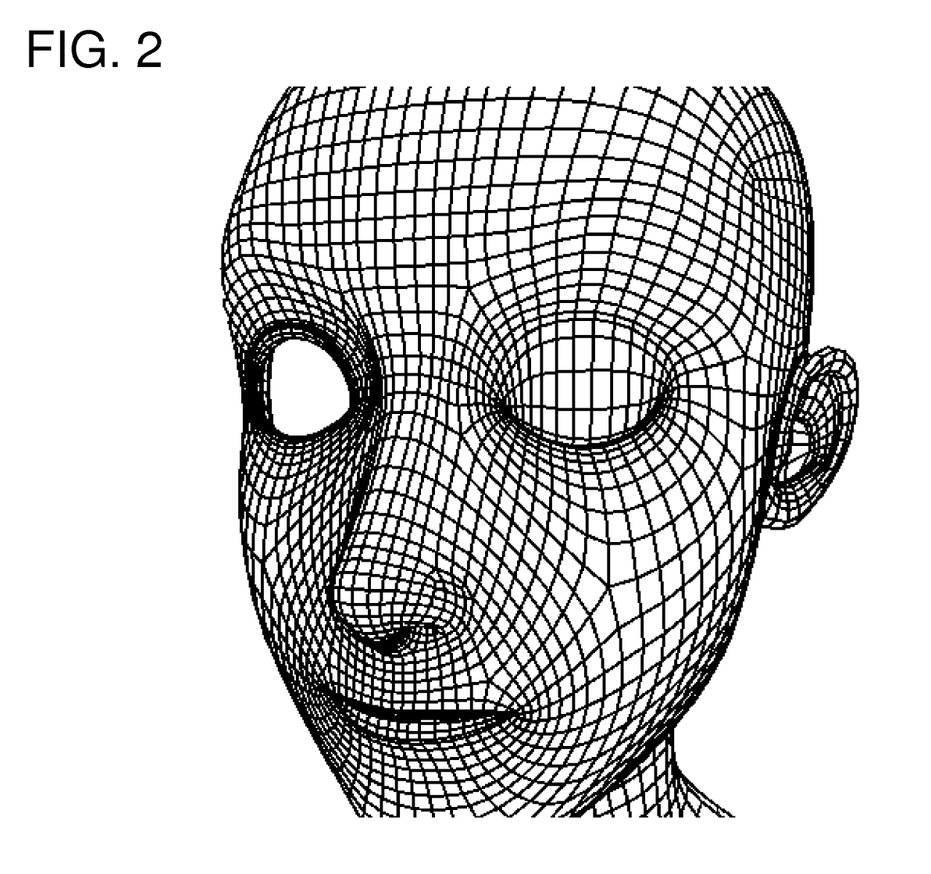
FIG. 2 shows an idealistic deformation of the man base character when the character shown in FIG. 1 is closing his left eye, which was produced manually by a designer.
Figure 3:
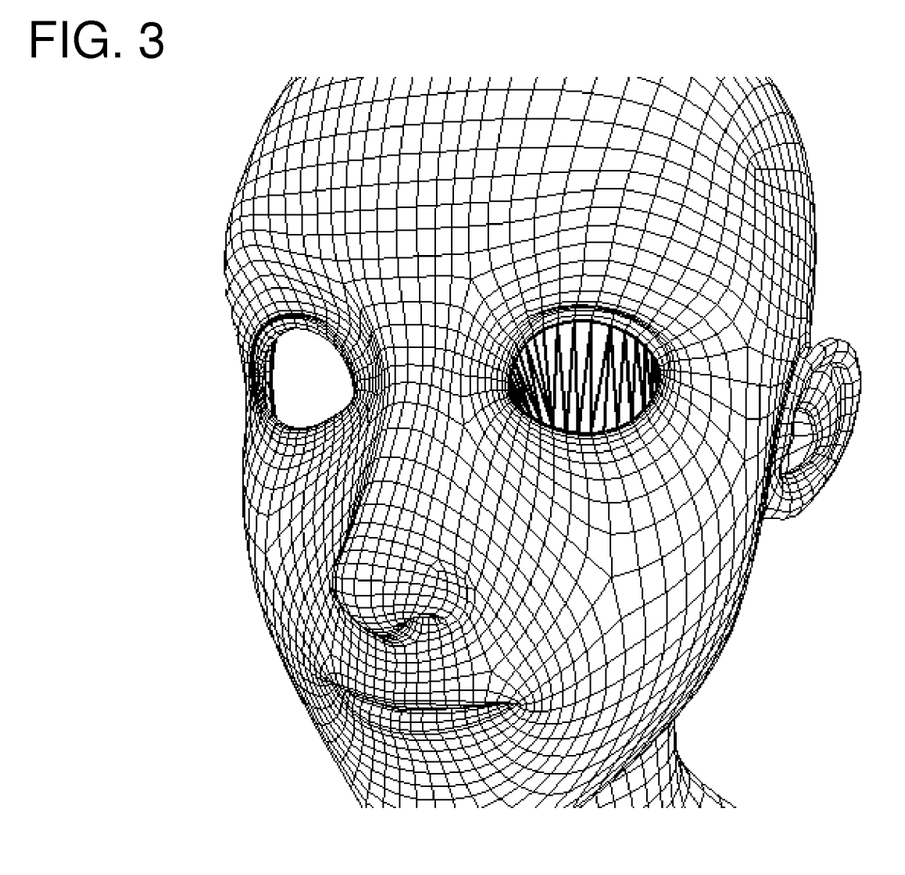
FIG. 3 shows a virtual triangular mesh assigned to the man base character of FIG. 1. A topologically same virtual triangular mesh is assigned to the character of FIG. 4 in implementation of an embodiment of the present invention.

FIG. 1 shows a 3D geometry of a face of a man base character before deformation; it shows his neutral face 3D geometry constructed by a mesh. FIG. 2 shows an idealistic deformation of the man base character when the character shown in FIG. 1 is closing his left eye, which was produced manually by a designer. FIG. 3 shows a virtual triangular mesh assigned to the man base character of FIG. 1. A topologically same virtual triangular mesh is assigned to the character of FIG. 4 in implementation of an embodiment of the present invention.

Figure 4:
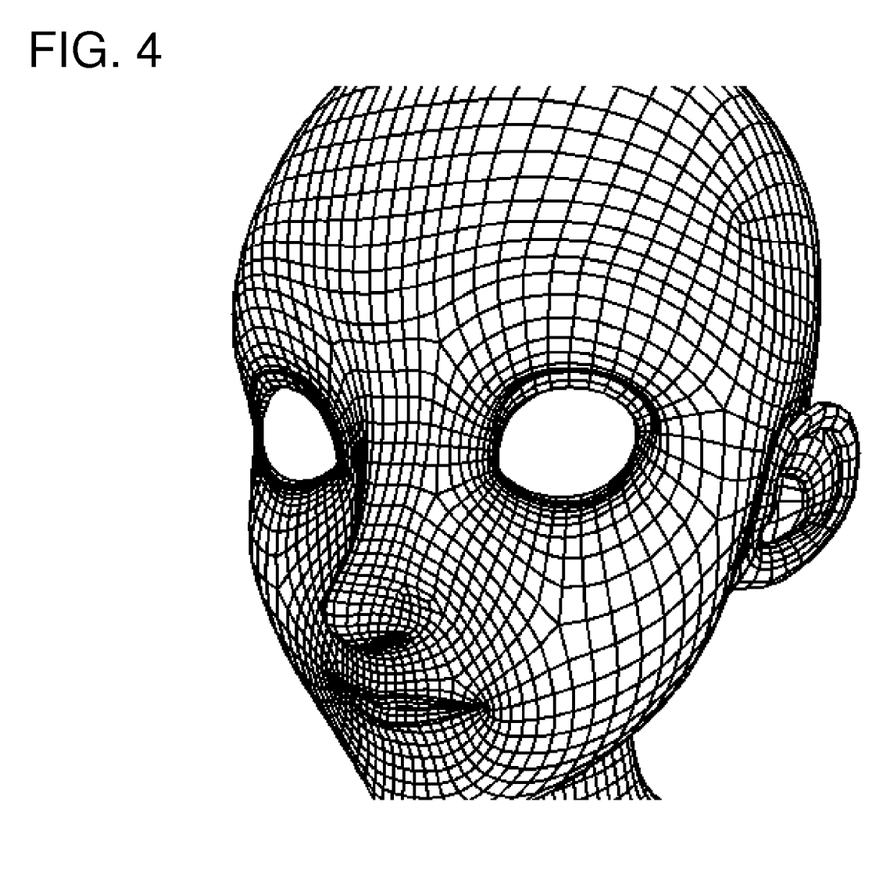
FIG. 4 shows a 3D geometry of a face of a woman base character before deformation; it shows her neutral face.
Figure 5:
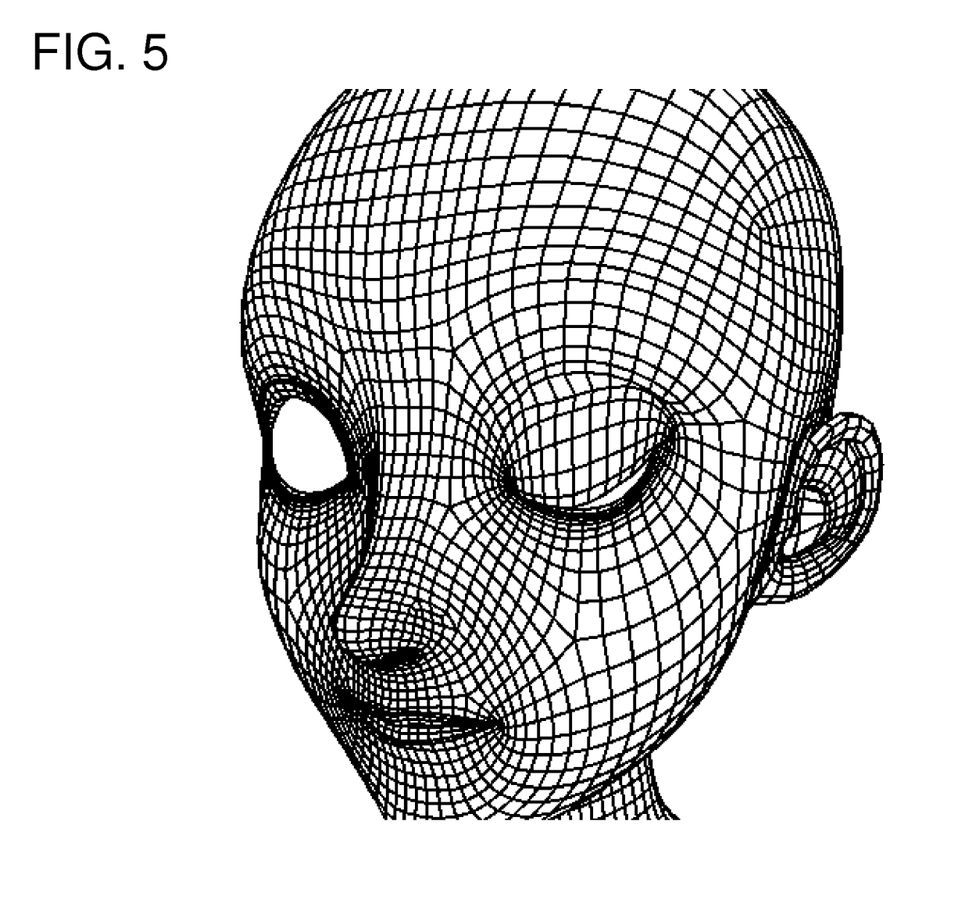
FIG. 5 shows a 3D geometry of the woman's character shown in FIG. 4 when she is closing her left eye, which was produced by the deformation transfer without a virtual triangular mesh.
Figure 6:
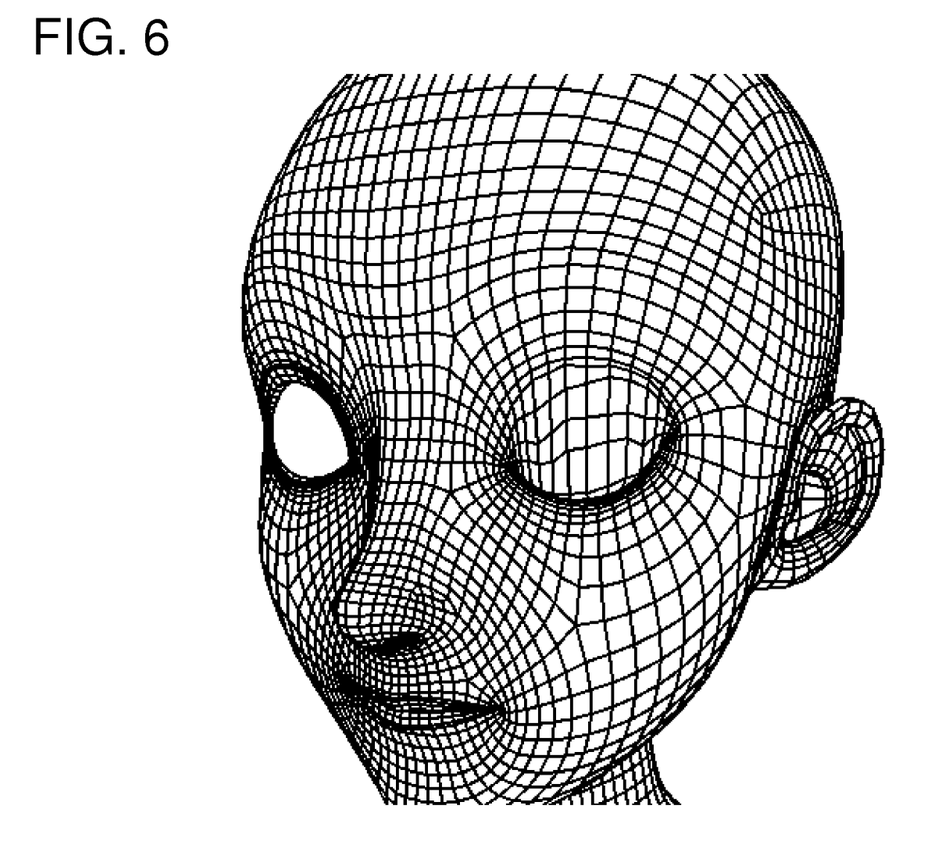
FIG. 6 shows a 3D geometry of the woman's character shown in FIG. 4 when she is closing her left eye, which was produced by the deformation transfer with a virtual triangular mesh (i.e., contract aware transfer) assigned to the eye.
Figure 7:
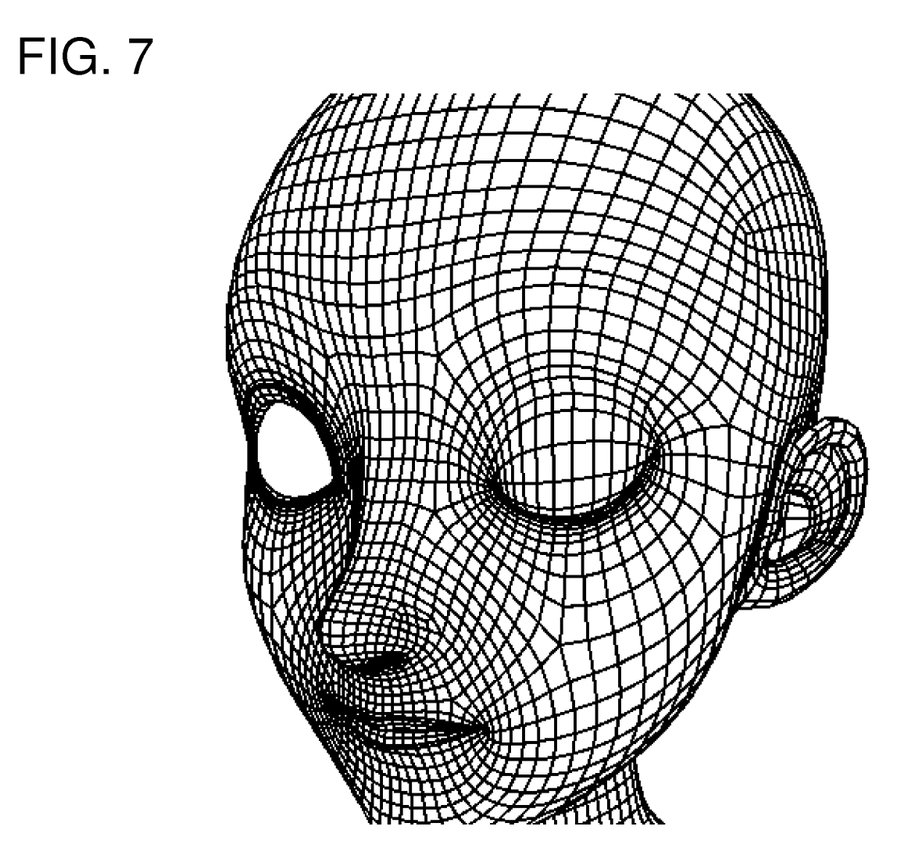
FIG. 7 shows a 3D geometry of the woman's character shown in FIG. 4 when she is closing her left eye, which was produced by the deformation transfer with a virtual triangular mesh assigned to the eye together with the Laplacian smoothing described above.

FIG. 4 shows a face of a woman base character before deformation; it shows her neutral face. FIG. 5 shows that the woman's character shown in FIG. 4 is closing her left eye, which was produced by the deformation transfer without a virtual triangular mesh. As shown in FIG. 4, with only virtual triangular mesh, the eye does not close completely. FIG. 6 shows the woman's character shown in FIG. 4 is closing her left eye, which was produced by the deformation transfer with a virtual triangular mesh (i.e., contract aware transfer) assigned to the eye. Although the eye completely closes this time, the mesh is not smooth. FIG. 7 shows the woman's character shown in FIG. 4 is closing her left eye, which was produced by the deformation transfer with a virtual triangular mesh assigned to the eye together with the Laplacian smoothing described above. As shown in FIG. 7, the resulting mesh at the left eye is smooth and the eye is completely closed. Artifacts are also absent.

Before introducing this tool/system, a rigger needed at least 3 days (24 hours) to create the initial version of a novel character's facial rig with 96 blendshape targets. After the introduction of the plain deformation transfer, the labor time was down to 8 hours. With the improvements of the present invention, it was further reduced to 6 hours. Riggers mostly concentrated on final cleanup and artistic fine-tuning with our improved tool. This shows that the tool achieved total of 4×speed-up in the facial rigging pipeline, 25% speed-up over the original deformation transfer.

The transfer of 96 blendshape targets to 4 characters (same mesh connectivity, 6821 vertices, 13,482 triangles, matrices preconstructed) takes 41 seconds on Maya 2013 running on Macbook Pro Core i7. Approximately 80% of this processing time is writing out vertex coordinates to Maya. Without Maya I/O, solving the linear system in Eq. (2) for the same configuration takes 7.22 seconds (18.8 msec per one character, one blendshape target). The construction of A and F in Eq. (2) for the same configuration take 15.0 seconds and 11.6 seconds (39.0 msec and 30.2 msec per one character, one blendshape target), respectively.

The above descried method and system provides a production-proven solution to practical problems in facial blendshapes transfer. Applying virtual triangles and weighted Laplacian regularization to deformation transfer produces contact-aware and smoothness-aware blendshapes transfer. The method described herein was used in the production of the film Space Pirate Captain Harlock (2013), freeing artists from hours of uncreative labor. Implementation using NumPy/SciPy allowed quick prototyping and smooth deployment, without sacrificing the run-time performance.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A method for deformation transfer of a source three-dimensional (3D) geometry to a target 3D geometry for computer-implemented blendshapes animation, the method comprising:
assigning a virtual triangular mesh having a plurality of virtual triangles to a prescribed region of an animated figure that are presented by a computer-generated mesh; and
solving a linear system equation by a computer to generate a mesh that represents a deformed state of the animated figure, said linear system equation being expressed by:

$$\begin{bmatrix} A \\ \alpha A_v \end{bmatrix} X' = \begin{bmatrix} F \\ \alpha F_v \end{bmatrix},$$

where X' is unknown vertex positions of a deformed mesh, F is deformation gradient of a nondeformed state, and A is a matrix that represents deformation gradient when multiplied by the vertex positions of the deformed mesh, and
where $A_v$ is a deformation gradient matrix of the virtual triangles of the deformed state, $F_v$ is a deformation gradient of the virtual triangles of the nondeformed state, and α is a prescribed weight.

2. A method for deformation transfer of a source three-dimensional (3D) geometry to a target 3D geometry for computer-implemented blendshapes animation, the method comprising:
solving a linear system equation by a computer to generate a mesh that represents the deformed state of an animated figure, said linear system equation being expressed by:

$$\begin{bmatrix} A \\ DL \end{bmatrix} X' = \begin{bmatrix} F \\ DLX \end{bmatrix},$$

where X' is unknown vertex positions of a deformed mesh, F is deformation gradient of a nondeformed state, and A is a matrix that represents deformation gradient when multiplied by the vertex positions of the deformed mesh, and where X represents vertex positions of the deformed mesh, L is a mesh Laplacian and D is a diagonal matrix storing regularization weight per vertex.

3. The method according to claim 1, wherein said linear system equation is expressed by:

$$\begin{bmatrix} A \\ \alpha A_v \\ DL \end{bmatrix} X' = \begin{bmatrix} F \\ \alpha F_v \\ DLX \end{bmatrix},$$

where X represents vertex positions of the deformed mesh, L is a mesh Laplacian and D is a diagonal matrix storing regularization weight per vertex.

4. The method according to claim 1, wherein the step of assigning a virtual triangular mesh includes receiving a user instructions to specify the virtual triangles.

5. The method according to claim 3, wherein the step of assigning a virtual triangular mesh includes receiving a user instructions to specify the virtual triangles.

6. A system for deformation transfer of a source three-dimensional (3D) geometry to a target 3D geometry for computer-implemented blendshapes animation, the system comprising:
a processor; and
a memory connected to the processor, storing instructions and data for causing the processor to execute the following steps:
assigning a virtual triangular mesh having a plurality of virtual triangles to a prescribed region of an animated figure that are presented by a computer-generated mesh; and
solving a linear system equation by a computer to generate a mesh that represents a deformed state of the animated figure, said linear system equation being expressed by:

$$\begin{bmatrix} A \\ \alpha A_v \end{bmatrix} X' = \begin{bmatrix} F \\ \alpha F_v \end{bmatrix},$$

where X' is unknown vertex positions of a deformed mesh, F is deformation gradient of a nondeformed state, and A is a matrix that represents deformation gradient when multiplied by the vertex positions of the deformed mesh, and
where $A_v$ is a deformation gradient matrix of the virtual triangles of the deformed state, $F_v$ is a deformation gradient of the virtual triangles of the nondeformed state, and $\alpha$ is a prescribed weight.

7. A system for deformation transfer of a source three-dimensional (3D) geometry to a target 3D geometry for computer-implemented blendshapes animation, the system comprising:

a processor; and a memory connected to the processor, storing instructions and data for causing the processor to execute the following step:

solving a linear system equation by a computer to generate a mesh that represents the deformed state of an animated figure, said linear system equation being expressed by:

$$\begin{bmatrix} A \\ DL \end{bmatrix} X' = \begin{bmatrix} F \\ DLX \end{bmatrix},$$

where X' is unknown vertex positions of a deformed mesh, F is deformation gradient of a nondeformed state, and A is a matrix that represents deformation gradient when multiplied by the vertex positions of the deformed mesh, and where X represents vertex positions of the deformed mesh, L is a mesh Laplacian and D is a diagonal matrix storing regularization weight per vertex.

8. The system according to claim 6, wherein said linear system equation is expressed by:

$$\begin{bmatrix} A \\ \alpha A_v \\ DL \end{bmatrix} X' = \begin{bmatrix} F \\ \alpha F_v \\ DLX \end{bmatrix},$$

where X represents vertex positions of the deformed mesh, L is a mesh Laplacian and D is a diagonal matrix storing regularization weight per vertex.

9. The system according to claim 6, wherein the system is configured to receive a user instructions to specify the virtual triangles.

10. The system according to claim 8, wherein the system is configured to receive a user instructions to specify the virtual triangles.

* * * * *